United States Patent

[11] 3,589,376

| [72] | Inventor | Erwin Kohler<br>Hasselmannsweg 5, Ahrensburg near<br>Hamburg, Germany |
|---|---|---|
| [21] | Appl. No. | 724,334 |
| [22] | Filed | Apr. 26, 1968 |
| [45] | Patented | June 29, 1971 |
| [32] | Priority | Apr. 29, 1967 |
| [33] | | Germany |
| [31] | | K62,189 |

[54] METHOD OF MAKING WIGS
13 Claims, 19 Drawing Figs.

[52] U.S. Cl. .................................................. 132/5,
132/53
[51] Int. Cl. .................................................. A41g 3/00
[50] Field of Search .......................................... 132/5, 53,
54, 9, 49, 60, 105; 2/159, 207, 185 A

[56] References Cited
UNITED STATES PATENTS

| 1,090,198 | 3/1914 | Butler ........................... | 132/5 |
| 2,253,635 | 8/1941 | Mann ........................... | 132/5 |
| 3,189,035 | 6/1965 | Heck ........................... | 132/5 |
| 3,420,249 | 1/1969 | Bonham ....................... | 132/53 |

FOREIGN PATENTS

| 888,757 | 2/1962 | Great Britain ................ | 132/5 |

Primary Examiner—Louis C. Mancene
Assistant Examiner—Gregory E. McNeill
Attorneys—Richards & Geier ABSTRACT: The invention is concerned with a method of making wigs, and particularly patch wigs, in which a male mould is covered with a shell, hairs are pricked through the shell, and the shell is removed from the mould. The mould is then covered with a piece of textile material which is impregnated with a synthetic resin, the inner surface of the shell is coated with synthetic resin, and the shell is refitted to the mould again. When the resin has set with the ends of the hairs embedded in the resin and attached to the textile material the shell is removed, drawing the hairs through the shell. The wig, consisting of the piece of textile material with the hairs attached is finally removed from the mould.

PATENTED JUN29 1971 3,589,376

METHOD OF MAKING WIGS

The invention relates to a method of manufacturing wigs, and particularly patch wigs, shaped to fit the bald patch on a head, and the object of the invention is to provide a substitute for natural hair giving the most realistic effect possible.

The wigs of various kinds made for dolls' heads have hairs which are usually sewn or knotted to the supporting material. This method is unsuitable for wigs for human beings. Patch wigs for human beings are already known, in which the support consists of several layers of a material such as gauze, rubber, celluloid, or a variety of other synthetic materials. However these wigs are very expensive to manufacture and they are never perfect imitations of the real thing. The edge of the support is always recognizable. In order to conceal this edge, the hairs are usually combed in that direction. But even if this is done the wearer must always remain alert in case a gust of wind or a movement of his forehead reveals the edge of the support. A further disadvantage of wigs of this kind is that the support is comparatively thick, consisting as it does of several layers, and the parting can never be given a realistic appearance, because it necessarily reveals the edge of the support; where the support ends and the wearer's forehead begins.

The wearer of a wig constructed in this way runs many risks of being found out, even when he is wearing the wig under ordinary circumstances. The inconvenience of having the wig revealed is of course worse than revealing a natural bald head. The wearing of a wig of this kind becomes even more difficult in circumstances of physical activity, for example during the playing of sports when the wearer engages in violent or rapid movements. The wearer of a wig is particularly sensitive to this risk, because the wig itself is often used as a remedy for spiritual ailments such as an inferiority complex. It must therefore be possible to wear the wig under all circumstances. The wearing of the wig is not effective, as an imitation of a natural growth of hair, if it can only be worn under certain circumstances. The purpose of a wig is not satisfied if a fairly close examination of the margin, where the hair begins, that is to say the demarcation line between the forehead and the hair, reveals the presence of a wig.

The process according to the invention allows the manufacture of wigs, and particularly patch wigs, which can barely be distinguished from a natural growth of hair, and in which the support can hardly be distinguished from the natural skin of the forehead, and which can be worn even under the most extreme conditions. In accordance with the invention, in a method of making a wig the ends of hairs are inserted through a pierceable outer shell, which is fitted over a male mould corresponding in shape to the head, into a pierceable material beneath the shell; the hairs are temporarily anchored to the shell which is then separated from the pierceable material and the mould leaving the ends of the hairs projecting from the inner surface of the shell; a thin piece of textile material coated with a synthetic resin is mounted on the mould; the shell containing the hairs is also coated on its inner surface with a synthetic resin, and is then fitted again to the mould over the piece of textile material; and, when the resin has hardened, and the hairs have been released from the shell, the shell is then removed so that the hairs are drawn through the shell and remain attached to the piece of textile material to form the wig which is finally removed from the mould.

In this way a wig or patch wig is obtained whose supporting material is extremely thin and highly transparent, to the effect that the skin of the forehead merges imperceptibly into the wig support, the wig giving an impression as though the hairs are growing directly out of the skin of the wearer's head.

The hairs are firmly anchored in this thin layer, giving an effect closely resembling nature. The natural appearance is increased by the fact that after separating the outer shell the hairs can be laid over in the predetermined direction and embedded in the synthetic resin, so as to simulate a directional growth of the hair. In this way it becomes possible to manufacture each wig to suit individual requirements. Furthermore the wearer can handle the hair as though it is natural hair, giving it a parting where desired, or simply brushing it back away from the forehead. The hair on the wig can if desired be flattened down on the head, using known means, and the wig is so stable on the wearer's head that he can play sports with it on, and even take a bath without removing the wig. As an extreme case the wearer can even take a turkish bath without removing the wig.

The hairs are preferably inserted as far as the inner surface of an inner shell which forms the pierceable material and is fitted over the mould beneath the outer shell, the surface of the mould being the limiting surface preventing the hairs from being inserted any further. In this way the operator manufacturing the wig need not adjust the depth of insertion of each hair, the depth of insertion being regulated automatically by the hard surface of the male mould, so that all the hairs are automatically inserted to the same depth.

The hairs can be inserted by means of a forked needle, in such a way that each hair forms a loop in the inner shell. Each hair is pricked in individually, leaving two ends projecting outwards from the outer surface of the outer shell.

An alternative method is to insert the hairs right through the shell or shells and into the male mould to a certain depth. By this method it is unnecessary to insert all the hairs to the same depth, because the inwardly projecting hair ends can subsequently be mown down to the same length. If this method is used it is not necessary to form loops. Each hair is inserted by means of a needle which has a rounded tip containing a groove of diameter equal to the diameter of a hair. In this case each hair produces only a single hair end projecting outwards from the outer surface of the outer shell. Moreover the other end of the hair, that is to say the end projecting inwards from the inner surface of the shell or shells is also single and there is no loop. This method gets around a difficulty sometimes encountered when using a forked needle, in that the forked needle can act as a punch, leaving punched out particles of shell embedded in the wig support. These particles impair the appearance of the wig. Using a needle with a rounded point, as described above, the pricking process produces perforations of small diameter, each perforation containing only a single hair.

A further advantage obtained by inserting the hairs a certain distance into the male mould is that by this method only a single shell need be mounted on the male mould, making the process simpler and less expensive. The procedure is preferably to begin by applying a layer of synthetic resin to the under surface of the shell. The resin is allowed to harden, and then the shell, with its layer of resin, is mounted on the male mould. The hairs are then pricked in. The synthetic resin, which is preferably a polyester or a polyurethane, can be applied in several layers. The best resin to use has been found to be polyurethane. A single application of this resin in liquid form gives a coating approximately 200$\mu$m. in the wet state, corresponding to a dry film 60 to 80$\mu$m. The inner surface of the shell, that is to say the undersurface, is preferably given up to three coatings of resin.

After removing the shell assembly, consisting of the shell proper, the resin layer and the hairs, from the positive mould, the hairs are found to project to different lengths from the inner surface of the shell assembly. The hairs are then mown down to give an even pile, so that the hair ends forming the pile will subsequently be embedded in the wig support all to the same length. In the next operation the surface of the male mould and the inner surface of the shell assembly are given coats of resin. The shell assembly is then mounted on the male mould and the two parts pressed firmly together, whereby the pile of hair ends becomes entirely embedded in the resin. The shell assembly is pressed on to the surface of the male mould in such a way that excess resin is squeezed out, so as to form a thin and even layer of resin. A wig prepared in this way has a support in the form of a layer of resin which is perfectly even in thickness. The thickness of the support does not exceed 500 μm.

The nature of the hardening process depends on the type of resin used. For example if a polyurethane resin is used the hardening proceeds easily at room temperature.

To anchor the hairs on the surface of the shell, it is sufficient to apply an adhesive with a brush. However it is preferable to hold the hairs down on the surface of the shell by stretching over the shell a textile in the form of a net. The space between the shell and the textile is then filled with the adhesive. This method gives a more even layer of adhesive than can be obtained without using the textile. Furthermore the layer of adhesive can be very thin, because there is only a very narrow space between the textile and the surface of the shell. The resulting thin layer of adhesive is flexible, reducing the risk of fracture. It is advisable to anchor the hairs to the shell in this way, so that they cannot slip out of the shell during further manipulation. The anchoring of the hairs to the surface of the shell in this way causes no difficulties in subsequent handling.

In order to enhance the natural appearance of the wig, and to facilitate combing the hairs, the hairs are preferably embedded in the resin of the wig support at an angle to the surface, that is to say that they appear to grow out of the support at a slope. If two shells are used the hairs are given the desired slope after the two shells have been separated from each other. On the other hand, if only a single shell is used they are given the slope after the shell has been removed from the positive mould, and after the pile has been mown down to an even length. The hairs can be sloped by applying a hot iron, or by pressing or the like. The individual hairs can also be pricked into the shell at a slope. The hairs can be sloped so as to give the impression of a natural swirl in the hair.

In order to prevent the completed wig support from adhering to the male mould, the surface of the male mould is preferably given a coating of parting agent, or a parting foil is applied to its surface, before applying the resin.

In order to facilitate the removal of the shell, leaving the hairs behind, the hairs can be treated with a lubricant, allowing them to slip more easily as they are drawn through the perforations in the shell. The lubricant is easy to remove from the hairs afterwards.

In the manufacture of the male mould, the first operation is to stretch a transparent elastic foil over the part of the head which is to be covered by the wig. The outline of the bald patch is then drawn on the elastic foil. A female mould is then made of the area enclosed by the outline. The elastic foil, together with the female mould, are then removed from the head. A male mould is then made by casting a hardening substance, either in the form of a liquid or of a paste. These operations are extremely simple and allow the wig to be made to fit the head precisely.

In a particularly favorable method for rapidly making the male mould, and for manufacturing a wig with precision, after the outline has been drawn on the transparent, elastic foil, which can easily be done using a ballpoint pen, an intermediate female mould is made of a rapid-hardening material. After removing the intermediate female mould from the surface of the elastic foil, the outline, which has been transferred to the intermediate female mould, is cut deep into the surface of the female mould, the elastic foil having previously been removed from the patient's head. A master male mould is then cast from the intermediate female mould, the surface of the master male mould showing the outline in the form of a raised ridge. The master male mould is cut back along this outline, and the edges are slightly chamfered off. From this master male mould there is then made a female mould by casting. The final male mould is cast from this female mould, and therefore also has the slightly chamfered edges. The purpose of slightly chamfering the edges in this way is to ensure that the wig support has a sufficient curvature to grip the skin of the head, that is to say the extra curvature helps to attach the wig to the wearer's head. The female moulds can be made for example of gypsum or of some other rapid-hardening substance such as the alginate used in dentistry for making impressions of the patient's gums.

The male mould can be made of a hard material, for example gypsum or cement, the hard surface limiting the depth of insertion of the hairs, or any other of the usual hard compositions known to the technologist can be used. A variety of these compositions are available on the market under different names.

On the other hand, if the method used requires the hairs to be inserted right into the male mould, then the latter can have a surface layer of a hard but fairly flexible material. A material particularly suitable for this purpose has been found to be silicone rubber. This material is preferably applied to the surface of the male mould to form a layer of sufficient thickness to allow the inner ends of the inserted hairs to penetrate to a certain depth, the main part of the male mould being of gypsum. If the male mould is constructed in this way the hard surface of the gypsum also forms a limiting surface, automatically regulating the depth of penetration of the hairs.

To allow an easy and rapid separation of the male from the female mould, the female mould can be made into two parts, or alternatively its surface can be given a coating of a parting agent.

The shells are preferably made of soft P.V.C. and are formed from the male mould. This can be done for example by using a male mould which has a hard and durable surface. Over this there is then stretched a soft P.V.C. foil, of the kind available on the market. The foil is then warmed and then allowed to cool. The resulting shell is flexible and yet rigid enough to keep its shape during subsequent manipulation. The material of the shell must be flexible enough to allow the insertion needle to penetrate, squeezing the material of the shell aside, the material then returning around the hair and holding it fast so that the hair remains in place in the perforation when the needle is withdrawn.

In order to give the wig a natural appearance the hairs must be spaced so that they given the impression of growing out of the wig support at natural spacings. The outer surface of the shell may therefore have a grating pattern corresponding to the natural spacing of the hairs. The hairs are gripped in according to this grating.

The inner surface of the shell is preferably given a matt finish by the application of an abrasive. The outer surface of the wig support reproduces the matt surface, giving it a natural appearance which cannot be given by a smooth and shiny surface. A shiny surface would contrast with the natural appearance of skin. The edges of the wig support are slightly thinned down by abrasion, so as to provide an even less visible transition between the wig support and the skin of the head.

The invention will now be described by way of example with the help of the diagrammatic drawings, in which.

Figure 5:
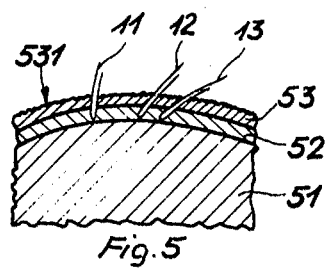
FIGS. 5 to 8 are similar cross sections through a part of the male mould, drawing successive steps in a wig making operation.
Figure 6:
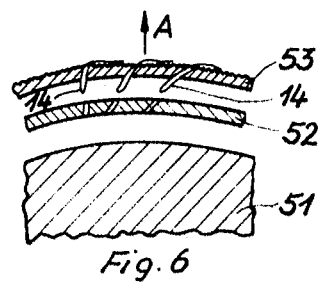
Figure 10:
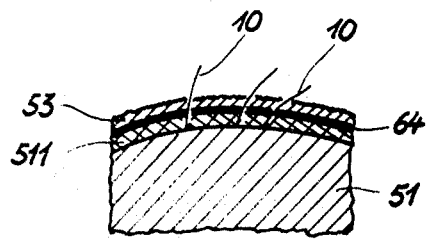
Figure 14:
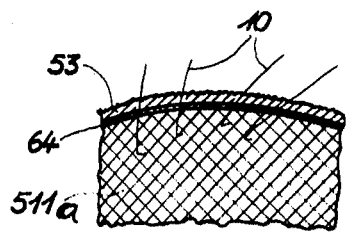
Figure 11:
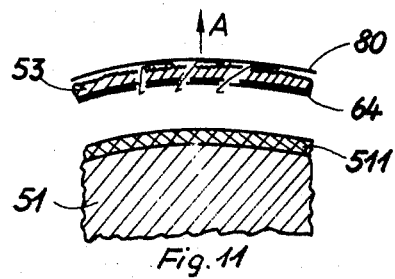
Figure 15:
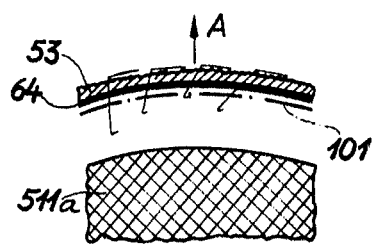
Figure 12:
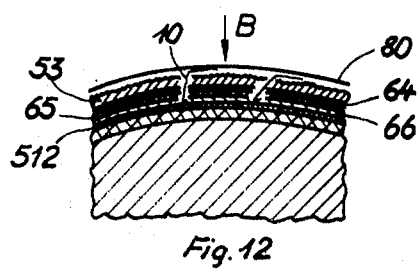
Figures 16, 17:
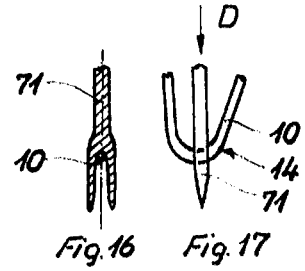
Figure 13:
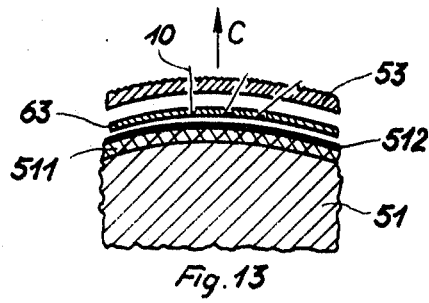
Figures 18, 19:
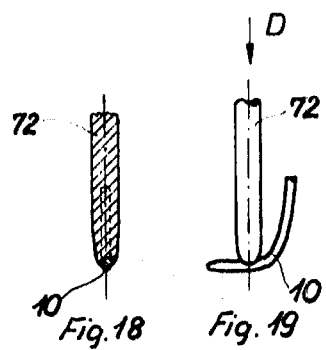

FIGS. 10 to 13 correspond to FIGS. 5 to 8, but show the steps of a different example of wig making operation;

FIGS. 14 and 15 correspond to FIGS. 5 and 6, and to FIGS. 10 and 11, but illustrate steps of a further example;

FIG. 16 is a section through a hair insertion needle;

FIG. 17 is a side view of the needle of FIG. 16;

FIG. 18 is a section through a different needle; and,

FIG. 19 is a side view of the needle of FIG. 18.

It should be observed that FIGS. 16 to 18 are drawn to a much larger scale than FIGS. 5 to 15. Moreover all the figures are merely illustrative and are not drawn to scale, nor are they intended to be realistic in regard to practical details.

Figure 1:
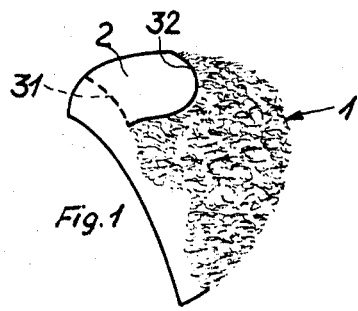
FIG. 1 is a side view of a head, showing a bald patch which is to be covered with a patch wig.
Figure 2:
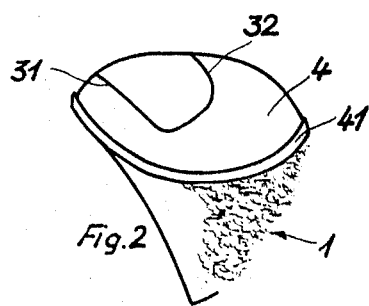
FIG. 2 shows the rubber foil stretched over the head shown in FIG. 1.
Figure 3:
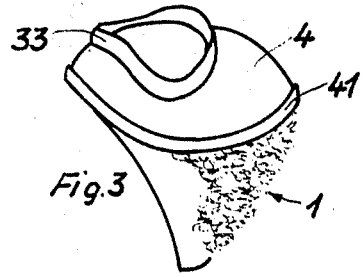
FIG. 3 illustrates the preparation of the female mould.
Figure 7:
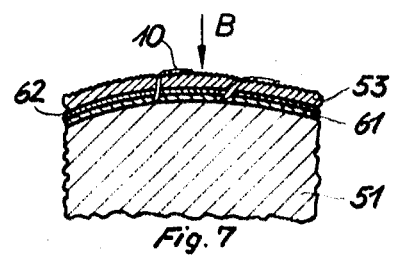

In FIG. 1 the head 1 has a bald patch 2, for which a patch wig is to be made according to the invention. The broken line 31 shows the front border of where the hair should be, and the full line 32 represents the boundary between the bald patch and the existing hair. In the first part of the process a transparent rubber foil 4 is stretched over the head 1, as shown in FIG. 2. The rubber foil 4 can be fixed in place on the head for example by means of an elastic band 41, or by some other means, so that it is located firmly in place on the head. The lines 31, 32 are then marked to the foil 4, as shown in FIG. 2. A sleeve 33 is mounted on the surface of the foil 4, as shown in FIG. 3. The sleeve 33 is somewhat larger than the area enclosed by the lines 31, 32. Into the sleeve 33 there is then poured a rapid-hardening substance, for example gypsum or an alginate. The line 31, 32 is transferred to the hardened substance. In this way there is obtained a female mould, which is then cut back precisely to the line 31, 32. The rubber foil 4 with its elastic band 41 is now removed from the head 1.

Figure 4:
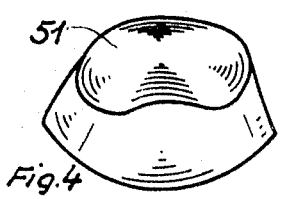
FIG. 4 shows the male mould.

A parting agent (such as a wax, a soap or a thin layer of cellophane) is then applied to the surface of the female mould, and the latter is enclosed in a second sleeve, which precisely follows the lines 31, 32. The vessel thus formed is filled with a liquid hardening substance, preferably a molten hardening cement. There is thus obtained a male mould 51, as shown in FIG. 4. The edges of the working surface of the male mould 51 are then slightly chamfered off so as to ensure that the final patch wig is curved inwards somewhat here, allowing it to grip the head.

As a variation of the above procedure, the female mould can if desired be used as an intermediate negative mould. For this purpose the lines 31, 32 are cut deeply into the surface of the female mould. In this there is then cast a master male mould from the surface of which the lines 31, 32 preject in the form of a raised ridge. The master male mould is then cut back along these lines, and the edge of its central surface is chamfered off as described above. From the master male mould there is then cast a female mould, which is used for casting the final male mould, which in this way also acquired chamfered off edges.

For the example of the process represented in FIGS. 5 to 8, the male mould 51 consists of a hard material such as gypsum or cement, whereas for the variation of the process represented in FIGS. 10 to 13 the male mould is a composite structure consisting of a hard core, for example of gypsum, supporting a surface layer 511 of a fairly hard resilient substance, such as a silicone rubber. In FIGS. 14 and 15 the male mould 511 consists entirely of a fairly hard but resilient substance.

Using the complete, hardened male mould 51, there are stretched over the surface of this two concentric shells 52, 53 of soft polyvinylchloride about 1 mm. thick. The outer surface of the outer shell 53 is impressed with a grating pattern 531 which is represented in the figure as a zigzag line. The grating is spaced with the spacing of natural hairs on a head. Alternatively the grating may be printed on the surface of the P.V.C. which is perfectly smooth. The outer surface of the inner shell 52 is perfectly smooth. The stretch process normally involves a warming of the material, and a subsequent cooling. In this way there are obtained shells 52, 53, which are sufficiently rigid and yet flexible enough to be manipulated easily.

The next procedure is to prick in the hairs, one hair going into each of the grating points in the surface of the shell 53. Using an insertion needle 71, as represented in FIGS. 16 and 17, each hair 10 is inserted through the two shells 52, 53 and pushed, by the insertion needle 71, which is ground into the shape of a fork, down as far as the hard surface of the male mould 51. It should be observed that the grating on the surface of the shell 53 is somewhat irregular, and it is not necessary to position the individual hairs regularly, the purpose being to obtain a slightly irregular distribution to simulate the appearance of natural hair.

Using the forked tool 71 each hair forms a loop, as shown in FIG. 5, the shell 52 acting as a distance piece. As will be seen from FIG. 5, the hairs can be pricked in any desired angle, giving an effect of directional growth. For example in FIG. 5 the hair 13 "grows flatter" than the hairs 12 and 11.

When all the hairs have been pricked in, as shown in FIG. 6, their outer ends are attached to the surface of the shell 53 by means of a dispersion adhesive. When the adhesive has hardened, the two shells 53 and 52 are lifted away from the male mould 51, as indicated by the arrow A in FIG. 6. After the shell 53 has been separated from the shell 52, the loops are drawn through the shell 52 forming an even pile on the inner surface of the shell 53. In order to emphasize the slope of the hairs, so that they appear to grow directionally from the surface of the wig, the loops 14 are laid over in the opposite direction.

In the next operation, a parting agent is applied to the surface of the male mould 51. Over this there is then applied a thin, transparent textile material 61, for example a piece of glass textile. The lower surface of the shell 53, from which the loops 14 project, is then given a coating of a liquid hardening resin, which can be a polyester or a polyurethane. The resin is also applied to the textile 61, mounted on the male mould 51. The shell 53 is then mounted again on the male mould 51, as indicated by the arrow B in FIG. 7. In order to form a good bond between the resin layer 62 and the textile 61, and in order to form a very thin and even foil for the support of the wig, the shell 53 is pressed down onto the surface of the male mould 51, excess resin being squeezed out at the sides during this process.

After the resin has hardened, the dispersion adhesive is removed from the outer surface of the shell 53, releasing the hairs. The shell 53 is then lifted away from the wig support 63, as indicated by the arrow C in FIG. 8. If necessary a lubricant can be used to allow the hairs to slip more easily out of the shell 53. Finally, the completed patch wig is separated from the male mould 51.

FIGS. 10 to 13 show a variation of this process, showing stages corresponding to those shown in FIGS. 5 to 8. In the process shown in FIGS. 10 to 13 the male mould 51 has a fairly hard but resilient outer layer 511. There is no shell 52. After the inner surface of the shell 53 has been coated with a thin layer of resin 64, the hairs 10 are pricked in and pushed down through the resilient layer 511. The resin used is preferably polyurethane, up to three applications being given to produce a final thickness of approximately 150μm. when the resin is dry. When the hairs are being pricked in the depth of insertion is limited by the hard surface of the male mould 51.

In this case a needle 72 shown in FIGS. 18 and 19 is used for the pricking. This needle is not forked, but has a small groove in the tip, of the diameter approximately equal to that of each hair. The depth of the groove is not more than the diameter of a hair. The tip of the needle obtains purchase near the end of the hair and in this case no loop 14 is formed. The needle is inserted, with the hair, in the direction of the arrow D, penetrating through the shell 53, through the resin layer 64, and through the resilient layer 511. The needle itself is then withdrawn, leaving the hair firmly embedded in the surrounding material.

The outer part of the hair is then temporarily attached to the surface of the shell 53, as shown in FIG. 11, by means of a piece of textile 80, which is stretched over the outer surface of the shell 53. The outer part of the hairs are then anchored to the surface of the shell 53 by applying adhesive to the outer surface of the textile 80. The adhesive penetrates into the space between the textile 80 and the surface of the shell 53, the space having only the thickness of a hair. In this way the hairs are anchored, temporarily but firmly to the surface of the shell 53. The shell 53 is then separated from the resilient layer 511.

When the adhesive has hardened the inner surface of the shell 53 is coated with a layer of resin 65. A separating foil 512 is mounted on the resilient layer 511, and to the separating foil 512 there is also applied a layer of resin 66. The resin layers 65 and 66 are of polyurethane. The shell assembly, consisting of the textile 80, the hairs 10, the shell proper 53 and the resin layers 64 and 65, is now applied to the male mould 51 and pressed firmly into contact. From here onwards the process is as described for FIGS. 7 and 8. The textile 80 and the adhesive under it are removed. The resin layers 64, 65, 66 are combined together by the pressing operation, forming the support 63 of the wig.

Figure 8:
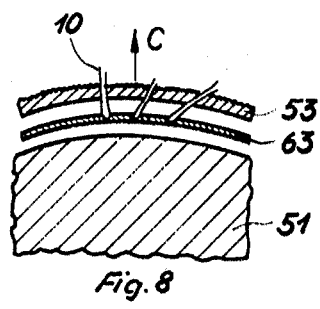

It is of course possible, if desired, to remove the resilient layer from the surface of the male mould, during the separating operation represented in FIG. 11, leaving the hard surface of the male mould 51 exposed. The procedure then continues as represented in FIGS. 5 and 8, that is to say the hard surface of the male mould is given a parting layer 512 and to the surface of this there is applied the resin layer 66.

If desired there can be used a male mould 511 as shown in FIGS. 14 and 15, consisting entirely of a fairly hard, resilient material, or consisting of a hard material with a thick layer of resilient material. In this case in the operation of pricking in the hairs 10, the individual hairs can penetrate to varying depths. The pricking in operation proceeds more rapidly under these circumstances, because the tip of the needle does not collide with a hard surface and therefore the operator need not fear rapid abrasion of the needle.

However this procedure results in an uneven pile of hair ends on the inner surface of the shell 53, as represented in FIG. 15. The uneven pile can however be mown down to an even length, for example by means of an electric razor, as shown by the broken line 101 in FIG. 15.

In all cases the under surface of the shell 53 is preferably roughened, or given a matt surface by the application of fine abrasive paper, before applying the resin layers 64. The purpose of this is to give the weight support 63 a matt upper surface, corresponding to the matt inner surface of the shell 53.

Figure 9:
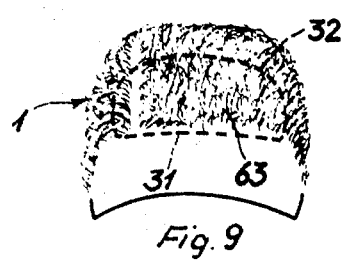
FIG. 9 is a front view of the head with the patch wig being worn.

The wig now consists of a support in the form of a resin, containing embedded hairs. The support is finally finished by chamfering the surfaces of the edges by means of abrasive, so as to obtain a smooth transition between the surface of the support and the skin of the head. The wig is applied to the bald patch of the head 1 by means of a suitable adhesive, so that it forms a perfect continuation of the natural hair growth, as represented in FIG. 9.

I claim:
1. A method of making a wig wherein portions of hairs are inserted through a pierceable outer shell, which is fitted over a male mould corresponding in shape to the head, into a pierceable material beneath the shell; the hairs are temporarily attached to the shell which is then separated from the pierceable material and the mould, leaving the ends of the hairs projecting from the inner surface of the shell; a piece of thin textile material carrying a layer of synthetic resin is applied to the mould; the shell containing the hairs is also coated on its inner surface with a synthetic resin, and is then fitted again to the mould over the layer of resin; and when the resin has hardened, the shell is removed whereby the hairs are drawn through the shell and remain attached to the foil formed by the textile material with hardened resin to form the wig which is finally removed from the mould.

2. A method according to claim 1, wherein an inner shell is fitted over said mould and said outer shell is fitted over said inner shell, said hairs being inserted through said outer and inner shells as far as the surface of said mould.

3. A method according to claim 2, wherein said hairs are inserted through said outer and inner shells so as to form loops in said inner shell.

4. A method according to claim 3, wherein said hairs are inserted individually into said outer and inner shells, by means of a forked needle.

5. A method according to claim 1, wherein said hairs are inserted through said shell and penetrate into the surface of said mould constituting said pierceable material.

6. A method according to claim 5, wherein before said outer shell is first fitted to said mould, said inner surface of said outer shell is coated with a synthetic resin and said resin hardens.

7. A method according to claim 6, wherein pile formed by said hair ends projecting from said inner surface of said outer shell after said outer shell has been removed from said mould for the first time, is cut to an even length.

8. A method according to claim 1, wherein said hairs are temporarily anchored to said outer shell by stretching a net over said outer surface of said outer shell and applying an adhesive to said net whereby said adhesive penetrates into the space between said net and said outer shell where said hairs are trapped.

9. A method according to claim 1, wherein said hair ends projecting from said inner surface of said outer shell are laid over in a desired direction, corresponding to a direction of natural growth, just before coating said inner surface of said outer shell with said resin to embed said hair ends.

10. A method according to claim 1, wherein said outer shell consists of a layer of soft polyvinylchloride conforming in shape to that of said male mould.

11. A method according to claim 10, wherein said outer surface of said outer shell is provided with a grating with spacings corresponding to the lateral spacings of hairs in a head.

12. A method according to claim 10, wherein said inner surface of said outer shell is ground to a matt finish.

13. A method in accordance with claim 1, wherein after said outer shell is removed from said mould the outer surface of the mould is coated with a parting agent or foil consisting of wax, soap or a layer of cellophane before the piece of textile material is applied thereto.